310-11 SR CROSS REFERENCE SEARCH ROOM
FIP8502 XR 2,764,741

Sept. 25, 1956 E. D. BANTA 2,764,741

ELECTROMECHANICAL DELAY MEANS

Filed Nov. 7, 1952

INVENTOR.
EDWIN D. BANTA
BY
Brown, Denk & Synnestvedt
AGENTS

United States Patent Office
2,764,741
Patented Sept. 25, 1956

2,764,741

ELECTROMECHANICAL DELAY MEANS

Edwin D. Banta, Larchmont, Pa., assignor to Philco Corporation, Philadelphia, Pa., a corporation of Pennsylvania Application November 7, 1952, Serial No. 319,229

8 Claims. (Cl. 333—30)

This invention relates to signal delay systems and more particularly to signal delay systems for providing relatively long delay intervals which can be readily adjusted in length.

Delay lines currently in use fall into two general types. In the first type, electromagnetic waves from a source are introduced into a transmission line and then detected at some point in the transmission line electrically displaced from the source. The delay time is determined by the time required for the electromagnetic wave to be propagated from the source to the detector. In distributed constant transmission lines the delay time for a line of practical length is measured in fractions of a microsecond. Greater delays may be obtained by lumped constant, artificial transmission lines simulating distributed constant transmission lines of great length but even the lumped constant lines give satisfactory results if the delay is of the order of a few microseconds.

For delays of the order of several hundred microseconds a second type of delay line has been developed. These delay lines employ a transducer for converting the electrical signal to be delayed to a mechanical vibration. A suitable delay medium, either solid or fluid, is provided for propagating this mechanical vibration as a relatively slow moving acoustic wave. This acoustic wave may be a shear wave or a compressional wave at sonic, supersonic or ultrasonic frequency. A receiving transducer, spaced from the first transducer by a distance determined by the delay to be obtained, is employed to convert the acoustic wave to an electrical signal. The delay introduced by such a delay line is directly proportional to the path length of the acoustic wave. In order to provide delays of the order of 100 microseconds or more it is generally necessary to provide reflectors or reflecting facets that act to fold the delay path and thus conserve space and material. Multipath delay lines of this type are difficult and costly to construct and not altogether satisfactory from the standpoint of spurious signals resulting from unwanted reflections from the many reflecting surfaces. In both types of delay lines, the total time delay cannot be altered except by physically changing the size or other controlling parameter of the delay line.

Therefore it is an object of the present invention to provide a delay line having a long delay time for its physical size.

It is a further object of the invention to provide a single path delay line having a delay time at least as great as multipath delay lines now in current use.

Another object of the present invention is to provide a delay line in which the delay time may be controlled by electromagnetic means.

Still another object of the invention is to provide a superior type of delay line employing a medium for transmitting the signal intelligence not heretofore used in delay lines.

These and other objects of the invention are accomplished by employing a delay line in which the energy is conveyed from the energizing transducer to the receiving transducer in the form of magnetohydrodynamic waves, these waves having a much lower velocity of propagation than the compressional waves normally utilized in sonic delay lines. The magnetohydrodynamic waves are produced by establishing a magnetic field through a conductive fluid delay medium in the direction in which the waves are to be propagated.

For a better understanding of the invention together with other and further objects thereof, reference should now be made to the following detailed description which is to be read in conjunction with the accompanying drawings in which.

Figure 1:
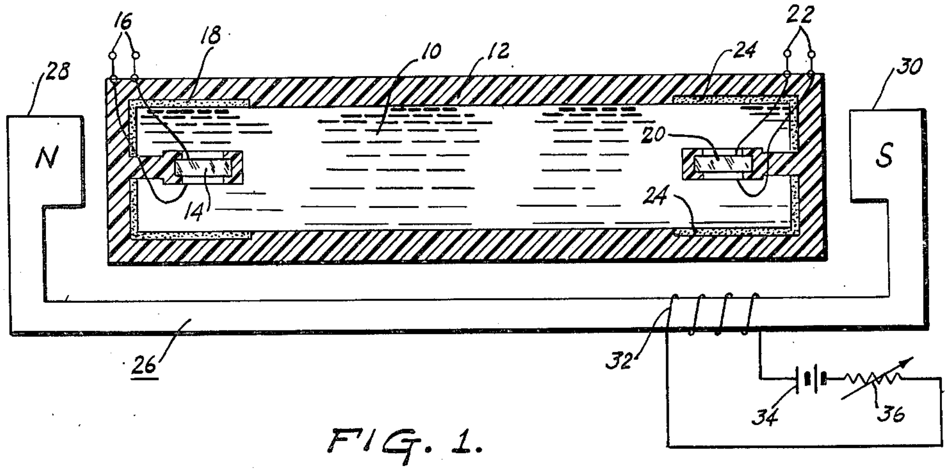
Fig. 1 is a schematic drawing, partially in section, of one preferred form of the invention.

In Fig. 1, a conductive fluid 10 is enclosed in a nonmagnetic housing 12. Fluid 10 may be mercury or other liquid metal or, in some instances, an ionized gas. Preferably, fluid 10 has a high conductivity and a high magnetic permeability but considerable compromise may be made in either or both of these characteristics before the attenuation, diffusion and/or velocity of the magnetohydrodynamic waves depart from useful ranges of values. Housing 12 preferably has a conductivity low compared to fluid 10 in order that currents induced in fluid 10 are not short circuited by the housing 12.

A signal transducer 14 is disposed at one end of housing 12 and is provided with leads 16 through which it may be energized by an electrical signal. Transducer 14 may be a piezoelectric crystal, a diaphragm, or any similar device capable of setting up mechanical vibrations in fluid 10 and which is appropriately supported as shown in the drawings. The type of transducer selected will depend upon the frequency and bandwidth of the signal to be delayed and the power level of the input signal. Transducer 14 is so disposed that, upon energization thereof, it will tend to propagate a compressional wave signal in the up and/or down direction as viewed in Fig. 1 but not to the left or right. Absorbing material 18 such as indium or an indium alloy is provided on the inside of housing 12 to absorb any of the compressional wave energy impinging thereon. However, as will be seen presently, the compressional wave will not reach housing 12 with any great amplitude even though initially propagated in that direction by transducer 14. It has been found that, in a delay line employing mercury, if the distance from transducer 14 to housing 12 is of the order of 15 cm., the absorbing material 18 may be omitted. For reasons that will appear as the description of the invention progresses, it may be desirable to provide means for damping out magnetohydrodynamic waves traveling towards the left from transducer 14. This can be done by forming absorber 18 of an electrically-dissipative material.

A receiving transducer 20 is spaced from transducer 14 by a distance determined by the delay to be introduced in the signals supplied to terminals 16. In a practical embodiment, this distance may be of the order of a small fraction of a meter. Transducer 20 is so oriented that a compressional vibration in the vertical plane as shown in Fig. 1 will energize it and cause an electrical signal to appear at leads 22. Transducer 20 may be similar in construction to transducer 14 but, if the attenuation in fluid 10 from transducer 14 to transducer 20 is relatively great, the two transducers may be of dissimilar nature with transducer 14 designed to handle a large amplitude signal and transducer 20 designed for maximum sensitivity. Absorbing material 24 is provided on housing 12 to minimize the possibility of stray compressional wave signals reaching transducer 20. Absorbing material 24 also damps out any magnetohydrodynamic waves which strike the right hand end of housing 12.

A magnet 26, having north and south pole pieces 28 and 30 respectively, supplies a magnetic field directed parallel to a line joining transducer 14 and transducer 20. Preferably, this magnetic field is uniformly distributed throughout a cross-section of housing 12 perpendicular to the line joining the two transducers. The intensity of the magnetic field will vary between the limits of several gauss and several kilogauss depending upon the size of the delay line, the characteristic of the fluid, and the delay to be obtained. It is believed at this time that the higher values of magnetic field, that is, of the order of several kilogauss, are to be preferred.

Magnet 26 may be either a permanent magnet or an electromagnet. If the delay of the system is to be subject to electromagnetic control, some means must be provided for altering the intensity of the magnetic field. This means is illustrated in Fig. 1 by coil 32 wound on the yoke of magnet 26 and energized by source 34 through a current control element 36. Source 34 and control element 36 have been illustrated as a battery and an adjustable resistor respectively, although, in many instances, more refined types of current supply and controlling elements will be found to be desirable.

Figure 2:
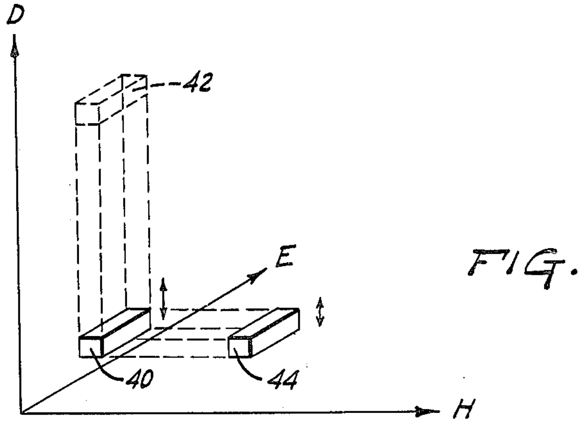
Fig. 2 is a three dimensional plot showing the relative directions of propagation of compressional waves and magnetohydrodynamic waves.

The operation of the embodiment of Fig. 1 is best explained by reference to the plots of Figs. 2 and 3. Assume that, in the plot shown in Fig. 2, the magnetic field supplied by magnet 26 is directed parallel to the axis designated as H. Assume further that transducer 14 is so oriented that a mechanical vibration is imparted to a prism 40 of fluid 10 which would ordinarily travel as a compressional wave in the direction of the axis designated as D.

Under conditions normally found in sonic delay lines, this compressional wave would move from element 40 to element 42 in some time *t* which is determined by the velocity of propagation of the compressional wave energy in the delay medium. However, in a delay line constructed in accordance with the teachings of the present invention, the compressional wave is converted to a magnetohydrodynamic wave which travels in the direction of the H axis and sets element 44 into vibration. The mechanical vibration of element 44 is in the direction of the D axis but the direction of propagation is in the direction of the H axis. The E axis of Fig. 2 is in the direction of the electric field induced in elements 40 and 44 due to their motion in the magnetic field. The E axis is perpendicular to the H and D axes.

Figure 3:
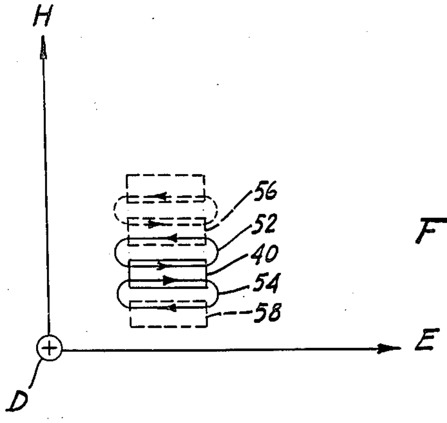
Fig. 3 is a two dimensional plot illustrating the manner by which magnetohydrodynamic waves are propagated in a conductive fluid.

The electrical phenomenon, upon which the conversion of a compressional wave into a magnetohydrodynamic wave depends, is illustrated in Fig. 3. Assuming as before that element 40 is set into motion in a direction perpendicular to the H and E axes, that is in a direction into the paper as shown in Fig. 3, an electric field, represented by lines 50 and 54, will be induced in element 40 in the positive direction of the E axis. The electric field produces currents in element 40 which are also in the positive direction of the E axis. It is well known that such currents induced in a conductor in motion in a magnetic field are in a direction such that an induced magnetic field will be set up which will interact with the existing magnetic field to exert a force tending to oppose the motion of the conductor. If element 40 is assumed to be moving solely due to its own momentum, the excitation of the transducer having terminated, it is clear that it will be brought to rest by the electric currents induced therein. However, the electric lines 52 and 54 representing the currents induced in element 40 must close outside element 40. In a highly conductive medium, they will close in the immediately adjacent elements 56 and 58 shown in Fig. 3.

It will be noted that the return currents in elements 56 and 58 are in the negative direction of the E axis. In accordance with established electrical principles, currents in this direction will tend to set elements 56 and 58 in motion in the positive direction of the D axis. Motion of elements 56 and 58 in the positive direction of the D axis will set up opposing currents in these elements tending to bring elements 56 and 58 to rest and set the adjacent elements in motion. Thus the magnetohydrodynamic wave will progress in both the positive and negative directions of the H axis as the adjacent elements are first excited and then brought to rest by the electric currents flowing therein.

In practical embodiments of the present invention, only one of these magnetohydrodynamic waves is actually used to propagate the signal, the other being damped out by suitable energy absorbing material to prevent spurious responses in the receiving transducer.

Returning now to the embodiment shown in Fig. 1 it should be clear that, although transducer 14 tends to set up a compressional wave traveling in the vertical direction, the action of the magnetic field and the currents induced in conductive fluid 10 are such as immediately to convert the compressional wave into a magnetohydrodynamic wave traveling in the direction of receiving transducer 20. Thus very little energy will be lost by energy striking absorbing material 18.

While the propagation of magnetohydrodynamic waves in an infinitely conducting medium can be explained by accepted electrical theory, the effect of a finite conductivity is not fully understood, largely due to the complexity of the mathematics involved in going from the special case of infinite conductivity to the general case of finite conductivity. The effect of compressibility of the fluid on the propagation of magnetohydrodynamic waves is not clear largely for the same reason. However, experimental results have shown that a magnetohydrodynamic wave can be propagated over a distance of the order of 30 cm. by the application of an electric field of the order of 10 kilogauss to a mercury conducting medium. It can be shown that the velocity of the magnetohydrodynamic wave in an infinitely conducting medium is given by the expression $$V=H\sqrt{\frac{\mu}{4\pi\rho}}$$

where:

H is the magnetic field strength in gauss,
$\mu$ is the magnetic permeability of fluid 10,
$\rho$ is the density of fluid 10, and
V is the velocity of the magnetohydrodynamic wave in meters per second.

It is believed that a finite conductivity produces a diffusion of the wave and consequent increase in attenuation without appreciably affecting the velocity of the wave. Therefore, it is possible to produce delay times of 2000 microseconds or more in delay lines having a physical length of less than a meter. Delays of the order of tens of milliseconds are possible by reducing the intensity of the magnetic field.

The relationship between the magnetic field strength and the velocity of propagation of the magnetohydrodynamic wave gives rise to a second important feature of the invention. By controlling the current through coil 32, the intensity of the magnetic field and consequently the velocity of the magnetohydrodynamic wave can be changed. This will alter the delay introduced between terminals 16 and 22. The current controlling device conventionally represented in Fig. 1 as an adjustable resistor may take the form of an electrical servo system arranged to maintain the delay time constant despite changes in temperature or other conditions affecting the delay time of a delay line. Alternatively, some form of control signal may be applied to coil 32 to modulate, in some preselected manner, the velocities of signals passing through the delay line. Control of the delay time in this manner is not possible in delay lines of conventional design. Therefore the present invention provides the two-fold advantage of a greater delay time per unit length and a variable delay time subject to electromagnetic control.

Mercury has been suggested as a practical fluid for use in the embodiment of Fig. 1 since this element is relatively easy to work with and is available in sufficient quantities for commercial production. In special applications it may be desirable to employ liquid metals having conductivities greater than that of mercury as the conductive fluid 10. Several metals are available with melting points of the order of 200° C. which have conductivities at least 10 times that of mercury. Alternatively, it may be desirable to employ an ionized gas as the transmission medium. It can be shown that a magnetohydrodynamic wave will be propagated in an ionized gas but, at the present time, it is believed that a conductive liquid will give superior results. Substances other than mercury, liquid metals and ionized gases which satisfy the condition of being a conductive fluid capable of propagating a magnetohydrodynamic wave fall clearly within the scope of my invention.

While there has been described what is at present considered to be preferred embodiments of the invention, the scope of the invention is more particularly pointed out in the hereinafter appended claims.

What is claimed is:

1. A delay line comprising a closed container, a conductive fluid medium substantially completely filling said closed container, first and second transducers disposed in contact with said medium, said first transducer being constructed and arranged to convert an oscillatory electrical signal supplied thereto to corresponding oscillatory displacements of said liquid medium, said second transducer being constructed and arranged to convert displacements of said fluid medium to a corresponding electrical signal, means for establishing a unidirectional magnetic field of controllable intensity directed along a line joining said two transducers, means for supplying the signal to be delayed to said first transducer, said first transducer being oriented so as to produce in response to the signal supplied thereto directive displacements of said fluid principally in a direction which is parallel to a single straight line which is perpendicular to the direction of said magnetic field, said second transducer being oriented so as to produce an output signal in response to displacements of said medium which are parallel to a single straight line which is at right angles to the direction of said magnetic field.

2. A delay line comprising a conductive fluid medium, first and second electroacoustical transducers disposed in contact with said fluid medium, means establishing a unidirectional magnetic field of controllable intensity directed along a line joining said two transducers, means for supplying an electrical signal to be delayed to said first transducer, said first transducer being so constructed and arranged as to produce in response to the signal supplied thereto directive displacements of said fluid medium principally in a radial direction parallel to a line which intersects and is perpendicular to the said line joining said two transducers and said second transducer being adapted to produce an electrical output signal in response to displacements of said medium which are at right angles to the direction of said magnetic field, and means for controlling the intensity of said magnetic field, thereby to control the velocity of propagation of said displacements from said first transducer to said second transducer as magnetohydrodynamic waves in said fluid medium.

3. A delay line comprising a container having the form of a closed elongated cylinder, each end of said container and a portion of the cylindrical surface adjacent each end being covered with an acoustically absorbing, electrically dissipative material, first and second electroacoustical transducers disposed within said closed container and adjacent the respective ends thereof, a conductive fluid substantially filling said closed container, means for supporting said transducers from said ends of said container, said container being formed of a substantially nonconductive, magnetically transparent material, said first transducer being supported so as to produce in response to electrical signals supplied thereto directive displacements of said fluid principally in a direction parallel to a line which intersects and is perpendicular to the axis of said cylinder, said second transducer being adapted to produce an electrical output signal in response to displacements of said medium which are at right angles to the direction of said axis of said cylinder, and means for establishing a unidirectional magnetic field of controllable intensity directed along a line joining said two transducers.

4. A delay line according to claim 3, said delay line further comprising means for controlling the intensity of said magnetic field, thereby to control the velocity of said displacements from said first transducer to said second transducer which occur as magnetohydrodynamic waves in said fluid medium.

5. A delay line as in claim 1, said delay line further comprising means for controlling the intensity of said magnetic field, thereby to control the velocity of said displacements from said first transducer to said second transducer which occur as magnetohydrodynamic waves in said fluid medium.

6. A delay line as in claim 1 wherein said fluid medium is a liquid metal.

7. A delay line comprising a conductive fluid medium, first and second piezoelectric transducers immersed in said fluid medium, each of said transducers having at least one substantially flat, active face disposed in contact with said fluid medium, said transducers being so disposed that the normals to all active faces in contact with said medium are directed parallel to a line which intersects and is perpendicular to a line joining said two transducers, means for establishing a unidirectional magnetic field of preselected intensity directed parallel to said line joining said two transducers, means for supplying an electrical signal to said first transducer and means for deriving a delayed electrical signal from said second transducer.

8. A delay line as in claim 7, said delay line further comprising means for controlling the intensity of said magnetic field, thereby to control the velocity of said displacements from said first transducer to said second transducer which occur as magnetohydrodynamic waves in said fluid medium.

References Cited in the file of this patent

Article: "Electricity In Space," by Hannes Alfven, published in Scientific American, May 1952, vol. 186, No. 5, pages 26 to 29 inclusive. (Copy in 178–44–18A.)